United States Patent

Tamaki et al.

(10) Patent No.: US 9,544,024 B2
(45) Date of Patent: Jan. 10, 2017

(54) WIRELESS POWER RECEIVING DEVICE AND WIRELESS POWER TRANSMISSION DEVICE

(71) Applicant: TDK CORPORATION, Tokyo (JP)

(72) Inventors: Kazutaka Tamaki, Tokyo (JP); Masahide Ohnishi, Tokyo (JP); Tadao Senriuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 395 days.

(21) Appl. No.: 14/312,235

(22) Filed: Jun. 23, 2014

(65) Prior Publication Data

US 2015/0001954 A1     Jan. 1, 2015

(30) Foreign Application Priority Data

Jun. 27, 2013   (JP) ................. 2013-134995

(51) Int. Cl.

| | |
|---|---|
| *H01F 27/42* | (2006.01) |
| *H04B 5/00* | (2006.01) |
| *B60L 11/18* | (2006.01) |
| *B60L 3/00* | (2006.01) |
| *B60L 3/12* | (2006.01) |
| *H02J 7/02* | (2016.01) |

(52) U.S. Cl.

CPC ............. *H04B 5/0037* (2013.01); *B60L 3/00* (2013.01); *B60L 3/12* (2013.01); *B60L 11/182* (2013.01); *H02J 50/10* (2016.02); *H02J 7/025* (2013.01); *Y02T 10/7005* (2013.01); *Y02T 10/7072* (2013.01); *Y02T 90/122* (2013.01); *Y02T 90/14* (2013.01)

(58) Field of Classification Search

CPC .................................................. H04B 5/0037

USPC ......................................................... 307/104
See application file for complete search history.

(56) References Cited

U.S. PATENT DOCUMENTS 6,161,762 A * 12/2000 Bashan ............ G06K 19/07769
                                                                                           235/380
2016/0072339 A1* 3/2016 Shichino ................. H02J 7/045
                                                                                           320/108

FOREIGN PATENT DOCUMENTS

| JP | S56-118414 U | 9/1981 |
|---|---|---|
| JP | 2010-226890 A | 10/2010 |
| JP | A-2013-5615 | 1/2013 |

OTHER PUBLICATIONS

Amos et al., Newnes Dictionary of Electronics, 1999, Fourth Edition, p. 227.*

\* cited by examiner

*Primary Examiner* — Daniel Cavallari
(74) *Attorney, Agent, or Firm* — Oliff PLC

(57) ABSTRACT

A wireless power receiving device includes a voltage detection unit that detects an output voltage value of a rectifying unit, a power reduction unit that includes a switching element connected to a charging unit in parallel, and a control unit that controls operations of the switching element. In a case where the output voltage value detected by the voltage detection unit exceeds a first reference voltage value set in advance, the control unit controls and turns the switching element on by applying a voltage to the switching element, and controls the value of the voltage to be applied to the switching element so that the difference between the voltage value calculated on the basis of a current flowing in the switching element and a second reference voltage value set in advance decreases.

6 Claims, 3 Drawing Sheets

WIRELESS POWER RECEIVING DEVICE AND WIRELESS POWER TRANSMISSION DEVICE

BACKGROUND OF THE INVENTION

1. Field of the Invention

The present invention relates to a wireless power receiving device and a wireless power transmission device.

2. Description of the Related Art

A wireless power transmission technology has been drawing attention in which power for charging a power storage device mounted in an electric vehicle or the like is supplied wirelessly from outside the vehicle without using a power cable.

In such a wireless power transmission technology, the occurrence of an abnormal condition in a device involved during transfer of high power may lead to degradation of or damage to the device mounted in the electric vehicle. Accordingly, there has been an increasing demand for the improvement of the safety of the entire device that uses a wireless power transmission technology.

In response to such a demand, Japanese Unexamined Patent Application Publication No. 2013-5615 proposes a power receiving device that includes a discharge unit for discharging reception power received by a power receiving unit in the case of occurrence of an abnormal condition in the power receiving device. Specifically, the power receiving device described in Japanese Unexamined Patent Application Publication No. 2013-5615 includes the discharge unit that has a relay and a resistor, which are connected to each other in series, and that is connected between paired power lines connecting a rectifier and a power storage device. In the case where an abnormal condition occurs in the power storage device and it is not possible to perform charging of the power storage device, power that remains is consumed by the resistor after power transmission is stopped so as not to be fed to the power storage device to thereby appropriately protect the power receiving device.

With the technology disclosed in Japanese Unexamined Patent Application Publication No. 2013-5615, in the case where an abnormal condition occurs in the power storage device and it is not possible to perform charging of the power storage device, power that remains is consumed by the resistor after power transmission is stopped. Accordingly, in the case where an abnormal condition, such as an overvoltage, in the power receiving device continues until power transmission is stopped, a voltage applied to the power receiving device may keep rising. However, the technology disclosed in Japanese Unexamined Patent Application Publication No. 2013-5615 does not take into consideration such a voltage rise when an abnormal condition of the power receiving device continues. In the case where a voltage applied to the power receiving device rises and exceeds an allowable level of power consumable by the discharge unit, a protective circuit element itself, which forms the discharge unit and is to provide a protective function, is damaged, which has been an issue.

In the case where an abnormal condition, such as an overvoltage, in the power receiving device continues until power transmission is stopped and a voltage applied to the power receiving device keeps rising, a voltage applied to a device to be protected also rises, which may result in degradation of or damage to the device. As a result, a stable protective function may be impaired, which has also been an issue.

SUMMARY OF THE INVENTION

Accordingly, the present invention has been made in view of the issues described above, and there are provided a wireless power receiving device and a wireless power transmission device having a protective function with increased stability, the protective function being activated in the case where an abnormal condition, such as an overvoltage, occurs.

A wireless power receiving device according to an aspect of the present invention is a wireless power receiving device that wirelessly receives power, the wireless power receiving device including a power receiving coil, a rectifying unit, a charging unit, a voltage detection unit, a power reduction unit, and a control unit. The rectifying unit is configured to rectify alternating-current power received by the power receiving coil to direct-current power. The charging unit is configured to charge a power storage device with the direct-current power. The voltage detection unit is configured to detect an output voltage value of the rectifying unit. The power reduction unit includes a switching element that is connected to the charging unit in parallel. The control unit is configured to control operations of the switching element. In a case where the output voltage value detected by the voltage detection unit exceeds a first reference voltage value set in advance, the control unit controls and turns the switching element on by applying a voltage to the switching element, and controls a value of the voltage to be applied to the switching element so that a difference between a voltage value calculated on the basis of a current flowing in the switching element and a second reference voltage value set in advance decreases.

According to the aspect of the present invention, the wireless power receiving device includes the power reduction unit including a switching element that is connected to the charging unit in parallel. In the case where the output voltage value detected by the voltage detection unit exceeds the first reference voltage value set in advance, the control unit controls and turns the switching element on by applying a voltage to the switching element. Accordingly, even in the case where an abnormal condition, such as an overvoltage, occurs in the wireless power receiving device, a large current caused by the overvoltage is distributed and flows into the charging unit and the switching element and therefore it is possible to suppress deterioration of or damage to devices, such as the charging unit.

Furthermore, in the wireless power receiving device according to the aspect of the present invention, the control unit controls the value of the voltage to be applied to the switching element so that the difference between the voltage value calculated on the basis of a current flowing in the switching element and the second reference voltage value set in advance decreases. Therefore, even in the case where an abnormal condition, such as an overvoltage, in the wireless power receiving device continues and the voltage keeps rising, a rise in a voltage applied to the charging unit and other devices as well as the switching element that provides a protective function may be minimized. Accordingly, it is possible to increase the stability of the protective function that is activated when an abnormal condition, such as an overvoltage, occurs.

Preferably, the wireless power receiving device may further include a current detection unit configured to detect a current value of the direct-current power fed to the charging unit and, in a case where the current value detected by the current detection unit falls below a reference current value set in advance, the control unit may control and turn the switching element on by applying a voltage to the switching element, and may control the value of the voltage to be applied to the switching element so that a difference between the voltage value calculated on the basis of a current flowing in the switching element and a third reference voltage value set in advance decreases. In the case where the value of a current that is fed to the charging unit becomes small, that is, in the case where the wireless power receiving device is in a light load state, the input impedance of the charging unit increases and the impedances at both ends of the power receiving coil seen from the feeding side also increase. As a result, a voltage applied to both ends of the power receiving coil may also increase in association with the increase in the impedances. According to an aspect of the present invention, in the case where the current value detected by the current detection unit falls below the reference current value set in advance, the control unit controls and turns the switching element on by applying a voltage to the switching element, and controls the value of the voltage to be applied to the switching element so that the difference between the voltage value calculated on the basis of a current flowing in the switching element and the third reference voltage value set in advance decreases. Accordingly, an increase in the input impedance of the charging unit is suppressed. As a result, an increase in the impedances at both ends of the power receiving coil seen from the feeding side is suppressed and therefore a rise in a voltage applied to both ends of the power receiving coil may be suppressed. Therefore, even in the case where the wireless power receiving device becomes in the light load state, it is possible to suppress deterioration of or damage to a device involved with certainty.

More preferably, the third reference voltage value may be smaller than the second reference voltage value. In this case, a current flowing in the switching element may be minimized and therefore it is possible to minimize a drop in power fed to the charging unit. Accordingly, effective power use may be achieved.

A wireless power transmission device according to an aspect of the present invention includes the wireless power receiving device described above and a wireless power feeding device.

According to the aspect of the present invention, it is possible to provide a wireless power transmission device having a protective function with increased stability, the protective function being activated in the case where an abnormal condition, such as an overvoltage, occurs.

According to the aspects of the present invention, it is possible to provide a wireless power receiving device and a wireless power transmission device having a protective function with increased stability, the protective function being activated in the case where an abnormal condition, such as an overvoltage, occurs.

DESCRIPTION OF THE PREFERRED EMBODIMENTS

Figure 1:
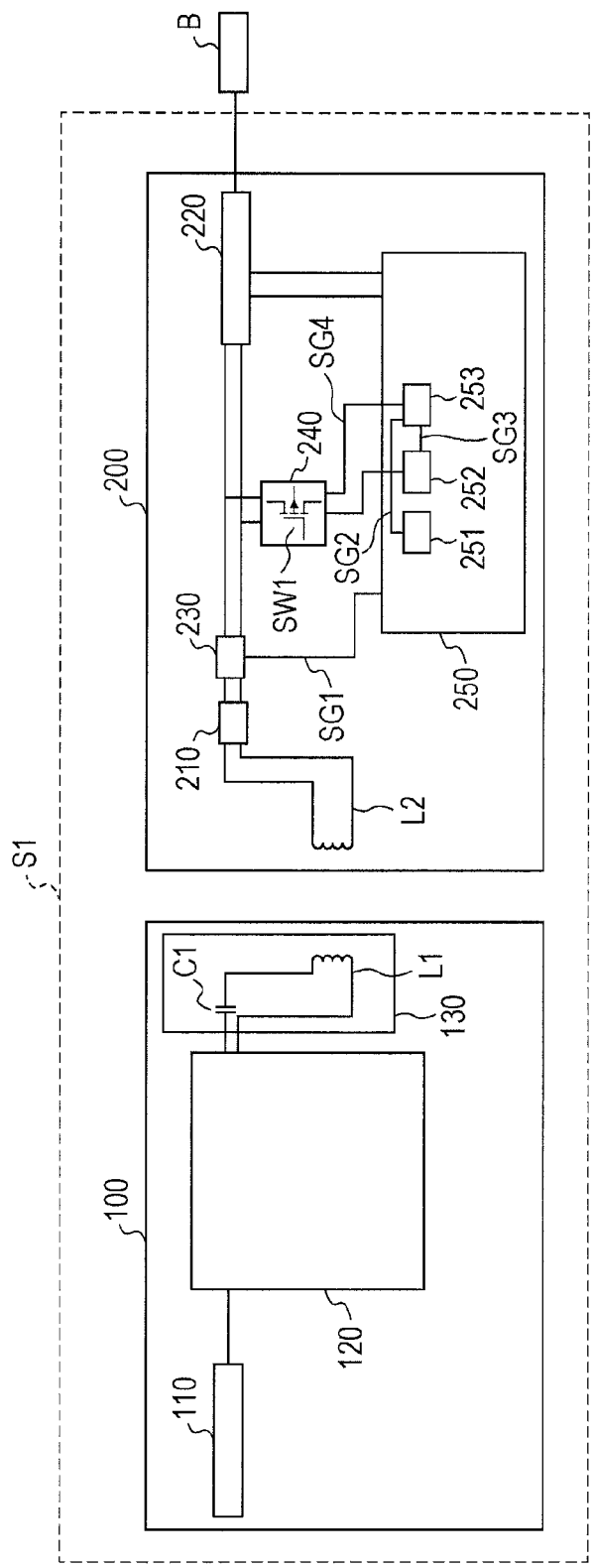
FIG. 1 is a circuit diagram illustrating a wireless power transmission device according to a first embodiment of the present invention together with a power storage device.

Hereinafter, embodiments of the present invention will be described in detail with reference to the drawings. Note that the same elements or elements having the same functions will be given the same reference numerals and duplicated description of such elements will be omitted.

First Embodiment

First, a configuration of a wireless power transmission device S1 according to a first embodiment of the present invention will be described with reference to FIG. 1. FIG. 1 is a circuit diagram illustrating the wireless power transmission device S1 according to the first embodiment of the present invention together with a power storage device B.

The wireless power transmission device S1 includes a wireless power feeding device 100 and a wireless power receiving device 200 as illustrated in FIG. 1.

The wireless power feeding device 100 includes a power source 110, a power conversion circuit 120, and a power feeding unit 130. The power source 110 supplies direct-current power to the power conversion circuit 120, which will be described below. The power source 110 may be any power source that outputs direct-current power and is not limited to a specific one. Examples of the power source 110 include a direct-current power source that outputs power obtained by rectifying and smoothing commercial alternating-current power, a secondary battery, a direct-current power source that outputs power from photovoltaic power generation, a switching power supply, such as a switching converter, and the like.

The power conversion circuit 120 has a function of converting input direct-current power supplied from the power source 110 to alternating-current power. The power conversion circuit 120 is formed of a switching circuit having a plurality of switching elements that are bridge-connected to each other. Examples of the switching elements that form the switching circuit include elements, such as a metal-oxide-semiconductor field-effect-transistor (MOSFET) and an insulated gate bipolar transistor (IGBT).

The power feeding unit 130 includes a power feeding coil L1 and a feeding-side resonant capacitor C1. The power feeding coil L1 is formed by winding a Litz wire made of copper, aluminum, or the like. The power feeding coil L1 has a shape of a planar coil, a solenoid coil, or the like, and the winding number thereof is appropriately set on the basis of the clearance between the power feeding coil L1 and a power receiving coil L2, which will be described below, and a desired power transmission efficiency. The power feeding coil L1 forms a feeding-side LC resonant circuit together with the feeding-side resonant capacitor C1. Note that the feeding-side resonant capacitor C1 is connected to the power feeding coil L1 in series in this embodiment, however, the form of connection is not limited to this. For example, the feeding-side resonant capacitor C1 may be connected to the power feeding coil L1 in parallel. In the case where the wireless power transmission device S1 according to this embodiment is applied to a power feeding facility for a vehicle, such as an electric vehicle, the power feeding unit 130 is disposed in the ground or in the vicinity of the ground surface.

The wireless power receiving device 200 includes the power receiving coil L2, a rectifying unit 210, a charging unit 220, a voltage detection unit 230, a power reduction unit 240, and a control unit 250. Here, the power feeding coil L1 of the wireless power feeding device 100 and the power receiving coil L2 of the wireless power receiving device 200 face each other with a distance therebetween. Therefore, the two coils are magnetically coupled to each other, alternating-current power fed from the power conversion circuit 120 to the power feeding unit 130 is induced to the power receiving coil L2 by an effect of near-field transmission, and electromotive force is excited. That is, the wireless power receiving device 200 wirelessly receives power from the wireless power feeding device 100.

The power receiving coil L2 is configured so as to be able to receive power from the power feeding coil L1, and is formed by winding a Litz wire made of copper, aluminum, or the like. The power receiving coil L2 has a shape of a planar coil, a solenoid coil, or the like, and the winding number thereof is appropriately set on the basis of the clearance between the power feeding coil L1 and the power receiving coil L2 and a desired power transmission efficiency. Note that, in this embodiment, the power receiving coil L2 does not form a resonant circuit together with other circuit elements included in the wireless power receiving device 200. That is, the power receiving coil L2 is substantially in a non-resonant state, however, the state of resonance is not limited to this. A resonant capacitor may be connected to the power receiving coil L2 so as to form a resonant circuit. In the case where the wireless power transmission device S1 according to this embodiment is applied to a power feeding facility for a vehicle, such as an electric vehicle, the power receiving coil L2 is disposed at the bottom of the vehicle.

The rectifying unit 210 has a function of rectifying alternating-current power received by the power receiving coil L2 to direct-current power. The rectifying unit 210 is formed of a bridge circuit, such as a half-wave rectifier circuit or a full-wave rectifier circuit, having a plurality of switching elements that are bridge-connected to each other, and a smoothing capacitor that is connected to the bridge circuit in parallel and generates a direct-current voltage by smoothing a rectified voltage.

The charging unit 220 charges the power storage device B with direct-current power rectified by the rectifying unit 210. Specifically, the charging unit 220 controls charging so as to perform constant-current constant-voltage (CCCV) charging of the power storage device B. That is, charging is controlled with a two-step charging method that includes a constant-current charging step of applying a constant charging current to the power storage device B and a constant-voltage charging step of controlling the charging current so that the battery voltage of the power storage device B becomes constant, the latter step being performed after the former step.

The voltage detection unit 230 is connected between the rectifying unit 210 and the charging unit 220, and has a function of detecting the output voltage value of the rectifying unit 210. By reading the output voltage value detected by the voltage detection unit 230, it is possible to confirm that power is fed from the rectifying unit 210 to the charging unit 220. The voltage detection unit 230 compares the detected output voltage value with a first reference voltage value set in advance and, if the detected output voltage value exceeds the first reference voltage value, outputs an output signal SG1 to the control unit 250, which will be described below. Examples of the voltage detection unit 230 include a voltage divider circuit, a voltage detection transformer, and the like.

The power reduction unit 240 is formed of a switching element SW1 that is connected to the charging unit 220 in parallel. Examples of the switching element SW1 include elements, such as an IGBT. The power reduction unit 240 has a function of reducing power to be fed from the rectifying unit 210 to the charging unit 220 by controlling on/off operations of the switching element SW1. That is, when the switching element SW1 is controlled and turned on, part of power to be fed from the rectifying unit 210 to the charging unit 220 is fed to the switching element SW1 and therefore power fed to the charging unit 220 is reduced. On the other hand, when the switching element SW1 is controlled and turned off, power is fed from the rectifying unit 210 to the charging unit 220 without being reduced.

The control unit 250 includes a switch drive control unit 251, a switch current monitoring unit 252, and a differential amplification unit 253.

The switch drive control unit 251 has a function of controlling operations of the switching element SW1. Specifically, the switch drive control unit 251 controls and turns the switching element SW1 on by applying a voltage to the switching element SW1 in the case where the output voltage value detected by the voltage detection unit 230 exceeds the first reference voltage value set in advance. In this embodiment, when the output signal SG1 is fed, the switch drive control unit 251 outputs an output signal SG2 indicative of a second reference voltage value set in advance to the differential amplification unit 253, which will be described below.

The switch current monitoring unit 252 monitors the value of a current that flows in the switching element SW1. Specifically, the switch current monitoring unit 252 is formed of a resistor that is connected to the switching element SW1 in series. The switch current monitoring unit 252 calculates a voltage value on the basis of a current that flows in the resistor by using Ohm's law, and outputs an output signal SG3 indicative of the calculated voltage value to the differential amplification unit 253, which will be described below.

The differential amplification unit 253 has a function of amplifying the difference between two input voltages by a certain coefficient. In this embodiment, the output signal SG2 outputted from the switch drive control unit 251 and the output signal SG3 outputted from the switch current monitoring unit 252 are assumed to indicate two input voltages, the difference between the voltage value indicated by the output signal SG2 and the voltage value indicated by the output signal SG3 is calculated, and only the difference is amplified. The differential amplification unit 253 outputs an output signal SG4 indicative of a voltage obtained by amplifying the difference between the two input voltages to the switching element SW1. That is, the voltage indicated by the output signal SG4 is applied to the switching element SW1, and the switching element SW1 is controlled and turned on. In this case, with the output signal SG4, a voltage obtained by adding, to a reference voltage, the voltage obtained by amplifying the difference between the two input voltages is outputted.

Here, operations performed by the control unit 250 will be described in more detail. First, when the switching element SW1 is in an off state (hereinafter simply referred to as an "initial state"), if the output voltage value detected by the voltage detection unit 230 exceeds the first reference voltage value set in advance, the output signal SG2 indicative of the second reference voltage value set in advance is outputted from the switch drive control unit 251 to the differential amplification unit 253. At this time, the switching element SW1 is in the off state and therefore the output signal SG3 of 0 V is outputted from the switch current monitoring unit 252 to the differential amplification unit 253. The differential amplification unit 253 outputs the output signal SG4 to the switching element SW1, the output signal SG4 being indicative of a voltage obtained by amplifying the difference between the voltage value indicated by the output signal SG2 and the voltage value (0 V in this case) indicated by the output signal SG3, and the switching element SW1 is controlled and turned on. When the switching element SW1 is controlled and turned on, the switching element SW1 exhibits a certain resistance value in accordance with the voltage applied to the switching element SW1, and the value of a current that flows in the switching element SW1 changes. In response to this, the output signal SG3 indicative of the voltage value calculated by the switch current monitoring unit 252 also changes. In this case, the difference between the voltage value indicated by the output signal SG2 and the voltage value indicated by the output signal SG3 obtained after such a change becomes smaller than the value in the initial state and therefore an amplified voltage indicated by the output signal SG4 also becomes low. By repeating the operations described above, the output signal SG4 indicative of an amplified voltage is controlled so that the difference between the voltage value indicated by the output signal SG2 and the voltage value indicated by the output signal SG3 decreases.

As described above, in the case where the output voltage value detected by the voltage detection unit 230 exceeds the first reference voltage value set in advance, the control unit 250 controls and turns the switching element SW1 on by applying a voltage to the switching element SW1, and performs operations in order to control the voltage value (indicated by the output signal SG4) to be applied to the switching element SW1 so that the difference between the voltage value (indicated by the output signal SG3) calculated on the basis of a current that flows in the switching element SW1 and the second reference voltage value (indicated by the output signal SG2) set in advance decreases.

Figure 2:
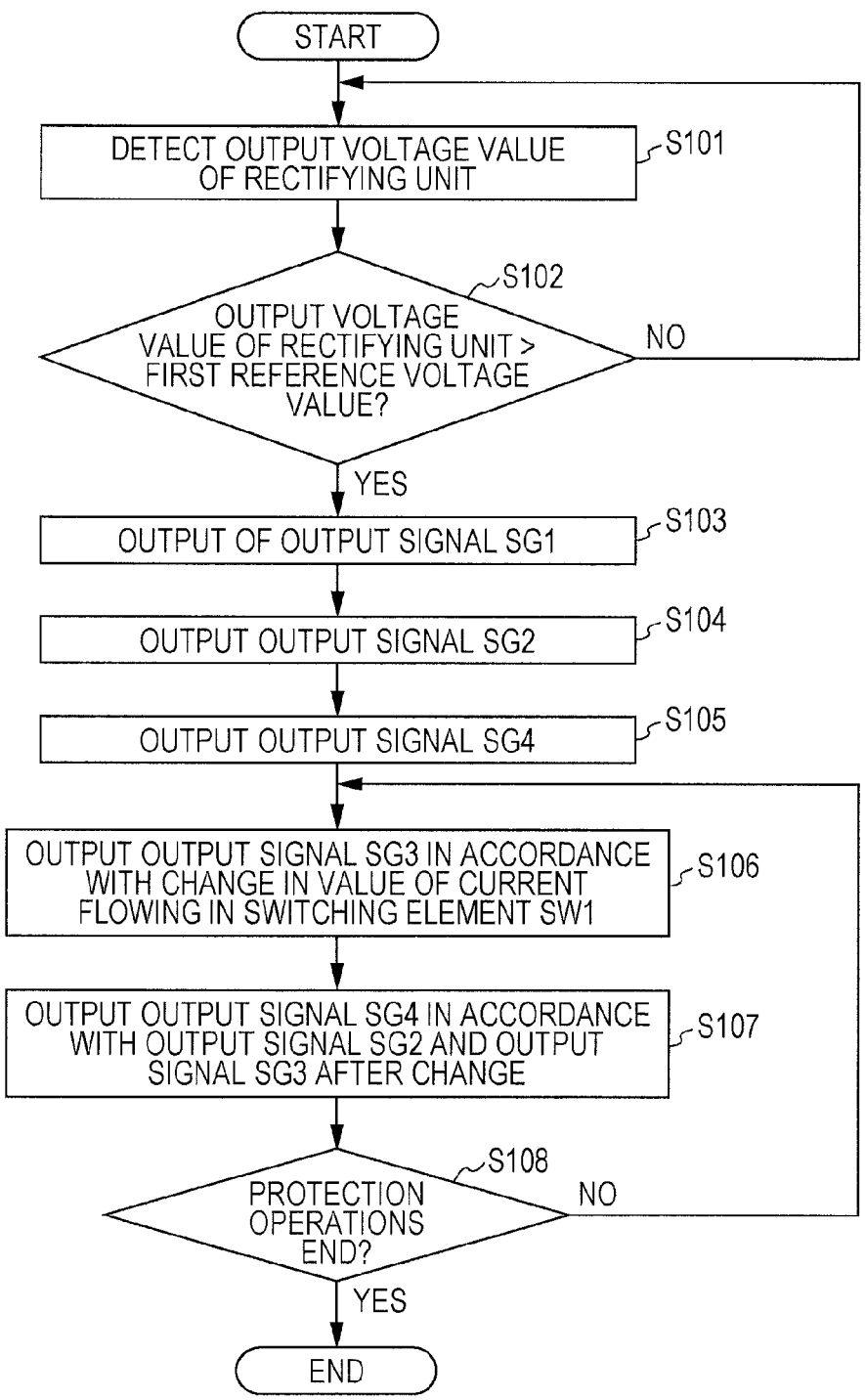
FIG. 2 is a flowchart illustrating protection operations performed by the wireless power transmission device according to the first embodiment of the present invention.

Next, protection operations to be performed, in the case where an abnormal condition occurs, by the wireless power transmission device S1 according to this embodiment will be described in detail with reference to FIG. 2. FIG. 2 is a flowchart illustrating protection operations performed by the wireless power transmission device S1 according to the first embodiment of the present invention.

First, when wireless transfer of power from the wireless power feeding device 100 to the wireless power receiving device 200 is started in the wireless power transmission device S1, the voltage detection unit 230 continuously detects the output voltage value of the rectifying unit 210 (step S101).

Subsequently, the voltage detection unit 230 compares the output voltage value detected in step S101 with the first reference voltage value set in advance. Here, the first reference voltage value set in advance is set as desired within an allowable range of the output voltage value with which it is possible to suppress degradation of or damage to a device that forms the wireless power receiving device 200 (step S102).

If the output voltage value detected in step S101 exceeds the first reference voltage value set in advance as a result of comparison between the output voltage value detected in step S101 and the first reference voltage value set in advance (Yes in step S102), the output signal SG1 is outputted from the voltage detection unit 230 to the switch drive control unit 251 of the control unit 250 (step S103).

On the other hand, if the output voltage value detected in step S101 falls below the first reference voltage value set in advance as a result of comparison between the output voltage value detected in step S101 and the first reference voltage value set in advance (No in step S102), the flow returns to step S101 and operations in steps S101 and S102 are repeatedly performed.

Subsequently, when the output signal SG1 is fed, the switch drive control unit 251 outputs the output signal SG2 indicative of the second reference voltage value set in advance to the differential amplification unit 253 (step S104). At this time, the output signal SG3 indicative of a voltage value calculated on the basis of a current that flows in the switching element SW1 is outputted to the differential amplification unit 253 from the switch current monitoring unit 252. Note that the output signal SG3 of 0 V is outputted in the initial state.

Subsequently, the differential amplification unit 253 outputs the output signal SG4 to the switching element SW1, the output signal SG4 being indicative of a voltage obtained by amplifying the difference between the voltage value indicated by the output signal SG2 and the voltage value indicated by the output signal SG3, and the switching element SW1 is controlled and turned on (step S105).

When the switching element SW1 is controlled and turned on, part of power to be fed from the rectifying unit 210 to the charging unit 220 is fed to the switching element SW1 and therefore power fed to the charging unit 220 is reduced. As a result, it is possible to suppress deterioration of or damage to a device, such as the charging unit 220, which may occur in the case where an abnormal condition, such as an overvoltage, occurs in the wireless power receiving device 200.

The switching element SW1 exhibits a certain resistance value in accordance with the voltage applied to the switching element SW1, and the value of a current that flows in the switching element SW1 changes. In response to this, the output signal SG3 indicative of a voltage value calculated by the switch current monitoring unit 252 also changes. The switch current monitoring unit 252 outputs the output signal SG3 obtained after such a change to the differential amplification unit 253 (step S106).

Subsequently, the differential amplification unit 253 outputs the output signal SG4 to the switching element SW1, the output signal SG4 being indicative of a voltage obtained by amplifying the difference between the voltage value indicated by the output signal SG2 and the voltage value indicated by the output signal SG3 obtained after the change, this voltage value being calculated in step S106 (step S107).

Subsequently, it is determined whether or not the output signal SG1 is being fed to the switch drive control unit 251 from the voltage detection unit 230 (step S108).

If it is determined that the output signal SG1 is being fed to the switch drive control unit 251 as a result of determination performed in step S108 (No in step S108), operations in steps S106 and S107 are repeatedly performed as long as the output signal SG1 is being fed to the switch drive control unit 251. By repeatedly performing such operations, the output signal SG4 indicative of a voltage amplified by the differential amplification unit 253 is controlled so that the difference between the voltage value indicated by the output signal SG2 and the voltage value indicated by the output signal SG3 decreases. That is, even in the case where an abnormal condition, such as an overvoltage, in the wireless power receiving device 200 continues and the voltage keeps rising, a rise in a voltage applied to the charging unit 220 and other devices as well as the switching element SW1 that provides a protective function may be minimized. Accordingly, it is possible to increase the stability of the protective function that is activated when an abnormal condition, such as an overvoltage, occurs.

On the other hand, if it is determined that the output signal SG1 is not fed to the switch drive control unit 251 any more as a result of determination performed in step S108 (Yes in step S108), the protection operations end.

As described above, the wireless power transmission device S1 according to this embodiment includes the power reduction unit 240 including the switching element SW1 that is connected to the charging unit 220 in parallel. In the case where the output voltage value detected by the voltage detection unit 230 exceeds the first reference voltage value set in advance, the control unit 250 controls and turns the switching element SW1 on by applying a voltage to the switching element SW1. Accordingly, even in the case where an abnormal condition, such as an overvoltage, occurs in the wireless power receiving device 200, a large current caused by the overvoltage is distributed and flows into the charging unit 220 and the switching element SW1 and therefore it is possible to suppress deterioration of or damage to devices, such as the charging unit 220.

Furthermore, in the wireless power transmission device S1 according to this embodiment, the control unit 250 controls the value of a voltage to be applied to the switching element SW1 so that the difference between the voltage value calculated on the basis of a current flowing in the switching element SW1 and the second reference voltage value set in advance decreases. As a result, even in the case where an abnormal condition, such as an overvoltage, in the wireless power receiving device 200 continues and the voltage keeps rising, a rise in a voltage applied to the charging unit 220 and other devices as well as the switching element SW1 that provides a protective function may be minimized. Accordingly, it is possible to increase the stability of the protective function that is activated when an abnormal condition, such as an overvoltage, occurs.

Second Embodiment

Figure 3:
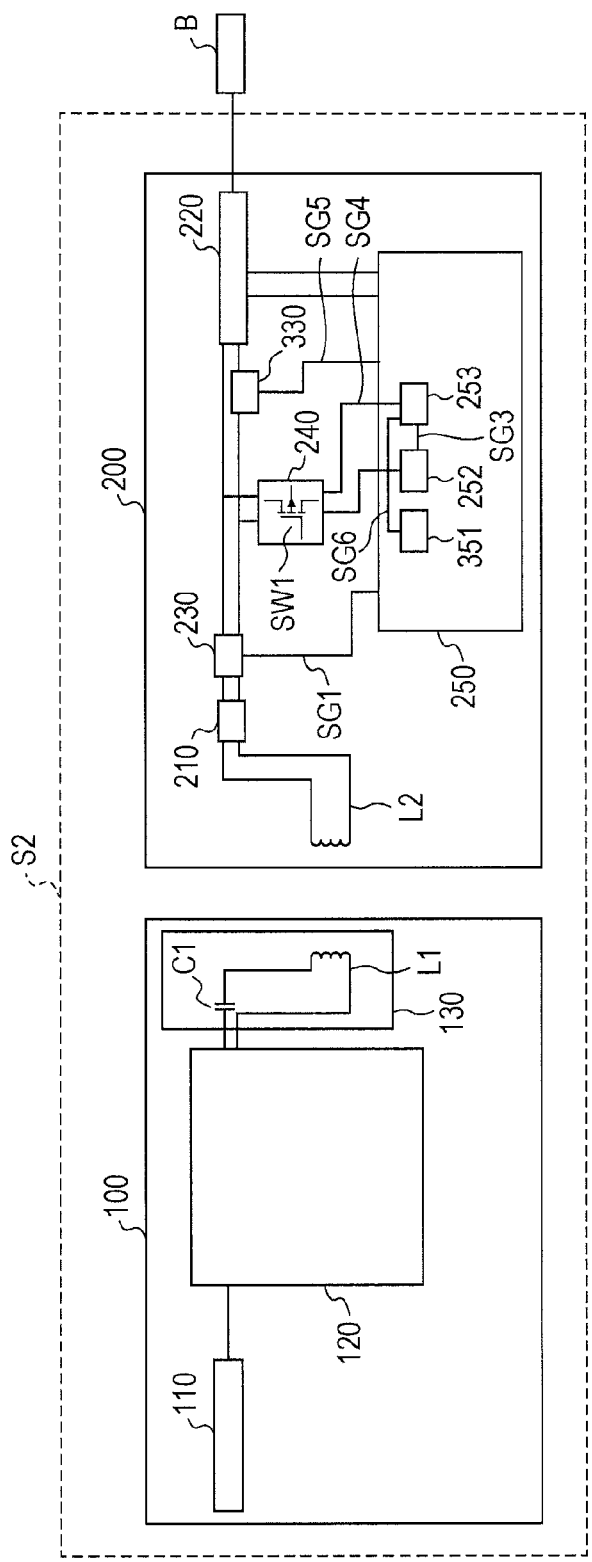
FIG. 3 is a circuit diagram illustrating a wireless power transmission device according to a second embodiment of the present invention together with a power storage device.

Next, a configuration of a wireless power transmission device S2 according to a second embodiment of the present invention will be described with reference to FIG. 3. FIG. 3 is a circuit diagram illustrating the wireless power transmission device S2 according to the second embodiment of the present invention together with the power storage device B.

The wireless power transmission device S2 includes the wireless power feeding device 100 and the wireless power receiving device 200 similarly as in the wireless power transmission device S1 according to the first embodiment. The wireless power transmission device S2 according to the second embodiment is different from the wireless power transmission device S1 according to the first embodiment in that the wireless power receiving device 200 includes a current detection unit 330 and that the control unit 250 operates differently. Hereinafter, differences from the first embodiment will be focused and described. Note that the configuration of the wireless power feeding device 100 of the wireless power transmission device S2 according to the second embodiment is similar to that of the wireless power feeding device 100 of the wireless power transmission device S1 according to the first embodiment.

As illustrated in FIG. 3, the wireless power receiving device 200 includes the power receiving coil L2, the rectifying unit 210, the charging unit 220, the voltage detection unit 230, the current detection unit 330, the power reduction unit 240, and the control unit 250. The configurations of the power receiving coil L2, the rectifying unit 210, the charging unit 220, the voltage detection unit 230, and the power reduction unit 240 are similar to those in the wireless power transmission device S1 according to the first embodiment.

The current detection unit 330 detects the value of a current of direct-current power fed to the charging unit 220. The current detection unit 330 compares the detected current value with a reference current value set in advance and, if the detected current value falls below the reference current value, outputs an output signal SG5 to the control unit 250. Examples of the current detection unit 330 include a current sensor, a current transformer, and the like.

The control unit 250 includes a switch drive control unit 351, the switch current monitoring unit 252, and the differential amplification unit 253. The configurations of the switch current monitoring unit 252 and the differential amplification unit 253 are similar to those in the wireless power transmission device S1 according to the first embodiment.

The switch drive control unit 351 has a function of controlling operations of the switching element SW1 as in the switch drive control unit 251 of the wireless power transmission device S1 according to the first embodiment. Specifically, in the case where the output voltage value detected by the voltage detection unit 230 exceeds the first reference voltage value set in advance, that is, in the case where the output signal SG1 is fed, the switch drive control unit 351 outputs the output signal SG2 indicative of the second reference voltage value set in advance to the differential amplification unit 253, and controls and turns the switching element SW1 on by applying a voltage to the switching element SW1. In this embodiment, in addition to the operations described above, in the case where the current value detected by the current detection unit 330 falls below the reference current value set in advance, that is, in the case where the output signal SG5 is fed, the switch drive control unit 351 outputs an output signal SG6 indicative of a third reference voltage value set in advance to the differential amplification unit 253, and controls and turns the switching element SW1 on by applying a voltage to the switching element SW1. Here, it is desired that the third reference voltage value be set smaller than the second reference voltage value. In this case, a current flowing in the switching element SW1 may be minimized and therefore it is possible to minimize a drop in power fed to the charging unit 220. Accordingly, effective power use may be achieved.

As described above, the wireless power transmission device S2 according to this embodiment further includes the current detection unit 330 that detects the value of a current of direct-current power fed to the charging unit 220. In the case where the current value detected by the current detection unit 330 falls below the reference current value set in advance, the control unit 250 controls and turns the switching element SW1 on by applying a voltage to the switching element SW1, and controls the value of the voltage to be applied to the switching element SW1 so that the difference between the voltage value calculated on the basis of a current flowing in the switching element SW1 and the third reference voltage value set in advance decreases. In the case where the value of a current that is fed to the charging unit 220 becomes small, that is in the case where the wireless power receiving device 200 is in a light load state, the input impedance of the charging unit 220 increases and the impedances at both ends of the power receiving coil L2 seen from the feeding side also increase. As a result, a voltage applied to both ends of the power receiving coil L2 may also increase in association with the increase in the impedances. In the wireless power transmission device S2 according to this embodiment, in the case where the current value detected by the current detection unit 330 falls below the reference current value set in advance, the control unit 250 controls and turns the switching element SW1 on by applying a voltage to the switching element SW1, and controls the value of the voltage to be applied to the switching element SW1 so that the difference between the voltage value calculated on the basis of a current flowing in the switching element SW1 and the third reference voltage value set in advance decreases. Accordingly, an increase in the input impedance of the charging unit 220 is suppressed. As a result, an increase in the impedances at both ends of the power receiving coil L2 seen from the feeding side is suppressed and therefore a rise in a voltage applied to both ends of the power receiving coil L2 may be suppressed. Therefore, even in the case where the wireless power receiving device 200 becomes in the light load state, it is possible to suppress deterioration of or damage to a device involved with certainty.

While the present invention has been described with reference to embodiments, the embodiments are merely examples and it will be understood by those skilled in the art that various modifications and changes may be made within the scope of the claims of the present invention and that such modifications and changes also fall within the scope of the claims of the present invention. Accordingly, the description and drawings in the specification have not been presented by way of limitation and should be treated as examples.

What is claimed is:

1. A wireless power receiving device that wirelessly receives power, comprising:
   a power receiving coil;
   a rectifying unit configured to rectify alternating-current power received by the power receiving coil to direct-current power;
   a charging unit configured to charge a power storage device with the direct-current power;
   a voltage detection unit configured to detect an output voltage value of the rectifying unit;
   a power reduction unit including a switching element that is connected to the charging unit in parallel; and
   a control unit configured to control operations of the switching element, wherein
   in a case where the output voltage value detected by the voltage detection unit exceeds a first reference voltage value set in advance, the control unit controls and turns the switching element on by applying a voltage to the switching element, and controls a value of the voltage to be applied to the switching element so that a difference between a voltage value calculated on the basis of a current flowing in the switching element and a second reference voltage value set in advance decreases.

2. The wireless power receiving device according to claim 1, further comprising:
   a current detection unit configured to detect a current value of the direct-current power fed to the charging unit, wherein
   in a case where the current value detected by the current detection unit falls below a reference current value set in advance, the control unit controls and turns the switching element on by applying a voltage to the switching element, and controls the value of the voltage to be applied to the switching element so that a difference between the voltage value calculated on the basis of a current flowing in the switching element and a third reference voltage value set in advance decreases.

3. The wireless power receiving device according to claim 2, wherein
   the third reference voltage value is smaller than the second reference voltage value.

4. A wireless power transmission device comprising the wireless power receiving device according to claim 1 and a wireless power feeding device.

5. A wireless power transmission device comprising the wireless power receiving device according to claim 2 and a wireless power feeding device.

6. A wireless power transmission device comprising the wireless power receiving device according to claim 3 and a wireless power feeding device.

* * * * *